(12) United States Patent
Chowdhury et al.

(10) Patent No.: US 6,843,617 B2
(45) Date of Patent: *Jan. 18, 2005

(54) STABILIZATION OF TOXIC METALS IN A WASTE MATRIX AND PORE WATER

(75) Inventors: Ajit Chowdhury, Madison, WI (US); Lane D. Tickanen, Green Bay, WI (US)

(73) Assignee: RMT, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/408,634

(22) Filed: Apr. 7, 2003

(65) Prior Publication Data

US 2003/0165359 A1 Sep. 4, 2003

Related U.S. Application Data

(63) Continuation-in-part of application No. 09/752,225, filed on Dec. 29, 2000, now Pat. No. 6,543,964, which is a continuation of application No. 09/099,738, filed on Jun. 18, 1998, now Pat. No. 6,254,312.

(51) Int. Cl.$^7$ .......................... B09C 1/08; C01G 28/00; G21F 9/00
(52) U.S. Cl. .............. 405/128.5; 405/129.25; 588/256; 423/87
(58) Field of Search .................. 423/87; 405/128.5, 405/129.25, 128.1, 128.15, 128.75, 128.7, 129.2, 129.1; 588/256, 249, 252; 210/911, 912

(56) References Cited

U.S. PATENT DOCUMENTS

| 4,079,003 | A | 3/1978 | Manchak |
|---|---|---|---|
| 4,723,992 | A | 2/1988 | Hager |
| 5,037,479 | A | 8/1991 | Stanforth |
| 5,114,592 | A | 5/1992 | Schuster et al. |
| 5,130,051 | A | 7/1992 | Falk |
| 5,202,033 | A | 4/1993 | Stanforth et al. |
| 5,252,003 | A | 10/1993 | McGahan |
| 5,347,077 | A | 9/1994 | Hooykaas et al. |
| 5,358,643 | A | 10/1994 | McClintock |
| 5,387,740 | A | 2/1995 | Sasae et al. |
| 5,430,235 | A | 7/1995 | Hooykaas et al. |
| 5,482,534 | A | 1/1996 | Leonard et al. |
| 5,637,355 | A | 6/1997 | Stanforth et al. |
| 5,769,961 | A | 6/1998 | Peters et al. |
| 5,810,920 | A | 9/1998 | Ueshima et al. |
| 5,859,306 | A | 1/1999 | Stanforth |
| 5,908,559 | A | 6/1999 | Kreisler |
| 6,027,543 | A | 2/2000 | Yoshizaki et al. |
| 6,254,312 | B1 * | 7/2001 | Chowdhury et al. ..... 405/128.5 |
| 6,543,964 | B2 * | 4/2003 | Chowdhury et al. ..... 405/128.5 |

OTHER PUBLICATIONS

"Arsenic Stabilization Project Exceeds Objectives," Enviro–Wire homepage, Summer 1997.
Masscheleyn et al., "Effect of Redox Potential and pH on Arsenic Speciation and Solubility in a Contaminated Soil," ES&T 25(8):1414 (1991)(Abstract).
Fendorf, S., "Processes Influencing the Mobility of Arsenic and Chromium . . . ," Grant Abstract, National Center for Environmental Research and Quality Assurance (1997).
"Solucorp's Molecular Bonding System (MBS) Expands Current Industry . . . ," Molecular Bonding System Applications Summary of Data Compilation Program (1997).
Vance, D.B., "Arsenic Chemical Behavior and Treatment," The National Environmental Journal May/Jun. 60–64 (1995).
Voigt et al., "Chemical Fixation of Arsenic in Contaminated Soils," Applied Geochemistry 11(5):633 (1996) (Abstract).

* cited by examiner

*Primary Examiner*—Frederick L. Lagman
(74) *Attorney, Agent, or Firm*—Quarles & Brady LLP

(57) ABSTRACT

A method is provided for stabilizing toxic materials in a waste matrix and in the pore water of the waste matrix. The method includes the steps of combining with the waste matrix (and pore water) an agent for controlling the oxidation-reduction potential of the matrix/water, an agent for controlling the pH of matrix/water, and an agent for adsorbing or coprecipitating the toxic material in the matrix/water.

59 Claims, No Drawings

STABILIZATION OF TOXIC METALS IN A WASTE MATRIX AND PORE WATER

CROSS-REFERENCE TO RELATED APPLICATIONS

The present patent application is a continuation-in-part of patent application entitled "Stablization of Arsenic-Contaminated Materials," application Ser. No. 09/752,225, filed Dec. 29, 2000, now U.S. Pat. No. 6,543,964, issued Apr. 8, 2003, which is in turn a continuation of a patent application entitled "Stabilization of Arsenic Contaminated Materials," application Ser. No. 09/099,738, filed Jun. 18, 1998, now U.S. Pat. No. 6,254,312, issued Jul. 3, 2001, the disclosures of each of which are hereby incorporated by reference as if set forth in their entirety herein.

STATEMENT REGARDING FEDERALLY SPONSORED RESEARCH OR DEVELOPMENT

Not applicable

BACKGROUND OF THE INVENTION

The present invention relates to methods for treating arsenic-contaminated waste matrix and associated pore water to stabilize the arsenic and reduce arsenic leaching to contaminant acceptable levels.

Arsenic, which is carcinogenic in its inorganic form, is identified in the Resource Conservation Recovery Act (RCRA) as a hazardous metal and is reportedly the third most common regulated inorganic contaminant found at Superfund sites. Specific sources of hazardous waste containing arsenic include:

\*pesticides and herbicides [MSMA (monosodium methane arsonate), cacodylic acid (dimethyl arsinic acid), sodium arsenite, lead arsenate)], \*ammonia still lime sludge from coking operations, \*veterinary pharmaceuticals [(RCRA waste listing K084) wastewater treatment sludge, (K101) distillation tar residue from distillation of aniline-based compounds, (K102) residue from use of activated carbon for decolorization], \*arsenic sulfide (D004) generated from phosphoric acid purification, and \*wood preservative manufacturing wastes.

Other anthropogenic sources of arsenic include:

\*coal-burning fly ash from energy production

\*copper, lead and zinc smelter operations

\*gold mining operations, and

\*glass manufacturing and cotton gin processing.

While arsenic, like other metals, exhibits a positive valence state, in aqueous materials it usually exists not as a solitary cationic species but as an oxy-anion, typically in a mixture of a trivalent (+3), reduced form (arsenite, $AsO_3^{3-}$) and/or a pentavalent (+5) oxidized form (arsenate, $AsO_4^{3-}$). As a result, technologies that effectively treat other cationic metals are typically not effective for stabilizing arsenic.

The ability of arsenic to change oxidation state under certain environmental conditions poses a challenge to treatment methods because the different oxidation states have different mobilities in the environment. Arsenite is usually more mobile than arsenate. Also, arsenic is amenable to numerous chemical and biological transformations in the environment, which can result in increased mobility. The mobility of arsenic can be controlled by redox conditions, pH, biological activity and adsorption/desorption reactions.

Arsenic stabilization chemistry is complex and is influenced significantly by the chemical speciation of arsenic (valence state, inorganic vs. organic, etc.), the oxidation-reduction potential and acidity/alkalinity of the waste matrix and associated pore water, and the presence of other metals, counter ions, and complexing ligands. Arsenic is often present in waste and associated pore water with lead or chromium. Typical techniques for stabilizing these metals (e.g., treating with phosphate to stabilize lead, or treating with reducing agents to stabilize chromium) can undesirably increase arsenic leachability from wastes and associated pore water. When arsenic and chromium are found together in the same matrix, the contaminants are typically present as chromated copper arsenate (CCA).

According to the U.S. Environmental Protection Agency, slag vitrification at 1,100 to 1,400\*C is the Best Demonstrated Available Treatment (BDAT) for arsenic. In a vitrification process, all forms of arsenic are converted to arsenic oxide, which reacts with other glass-forming constituents and becomes immobilized in the glass formed. In most arsenic stabilization situations, vitrification is impractical, however, because of the high energy costs and a secondary problem of volatilizing arsenic to cause air pollution.

Other known detoxification technologies include chemistries that involve solidification or chemical stabilization. "Solidification" is defined by US EPA as a technique that encapsulates the waste and associated pore water in a monolithic solid of high structural integrity. The encapsulation may be effected by fine waste particles (microencapsulation) or by a large block or container of wastes (macroencapsulation). Solidification does not necessarily involve a chemical interaction between the wastes and the solidifying reagents, but may mechanically bind the waste into the monolith. Contaminant migration is restricted by decreasing the surface area exposed to leaching and/or by isolating the wastes within an impervious capsule. "Stabilization" refers to those techniques that reduce the hazard potential of a waste and associated pore water by converting the contaminants into their least soluble, mobile, or toxic form. The physical nature and handling characteristics of the waste are not necessarily changed by stabilization. These definitions appear on page 2 of Conner, J. R., *Chemical Fixation and Solidification of Hazardous Wastes*, Van Nostrand Reinhold, New York (1990), which is incorporated herein by reference in its entirety.

U.S. Pat. No. 5,037,479 (Stanforth) discloses a method for treating solid hazardous waste containing unacceptable levels of leachable metals such as lead, cadmium and zinc, which includes the steps of mixing the solid waste with at least two additives, a pH buffering agent and an additional agent which is a salt or acid containing an anion that forms insoluble or non-leachable forms of the leachable metal, each agent being selected from a specified group of agents.

U.S. Pat. No. 5,202,033 (Stanforth et al.) discloses a method for treating solid hazardous waste containing unacceptable levels of leachable metals such as lead, cadmium, arsenic, zinc, copper and chromium, which includes the steps of mixing the solid waste in situ with a phosphate source or a carbonate source or ferrous sulfate. An additional pH controlling agent is optionally added under conditions which support reaction between the additive and pH controlling agent and the metals, to convert the metals to a relatively stable non-leachable form.

U.S. Pat. No. 5,430,235 (Hooykaas et al.) discloses a process for solidifying an arsenic-contaminated matrix as a rock-hard product using high dosages of a clay material, an iron salt, a manganese salt, an oxidizer, and a hydraulic binder such as Portland cement. The process disclosed in U.S. Pat. No. 5,430,235 has several disadvantages. Because of the requirement for a hydraulic binder, the process includes a curing period of 7 days or longer. The process also results in significant bulking (volume increase) of the treated waste materials. If dosage levels are lower than those identified as preferred, it is difficult to achieve solidification.

U.S. Pat. No. 5,347,077 (Hooykaas et al.) discloses a process for solidifying contaminated soil, sediment or sludge that may contain arsenic by adding iron, manganese, aluminum salts and Portland cement at dosages of 20 percent by weight and higher. Again, the process requires a curing period and has the additional disadvantage of high bulking after treatment. Hooykaas et al. use an oxidizing agent to oxidize organic matter, since it is difficult to solidify the waste matrix in the presence of organic matter.

U.S. Pat. No. 5,252,003 (McGahan) discloses a process for controlling arsenic leaching from waste materials by adding iron (III) ions and magnesium (II) ions, preferably in the form of iron (III) sulfate and magnesium oxide.

U.S. Pat. No. 4,723,992 (Hager) discloses a process for fixing pentavalent arsenic in soil by adding metal salts or iron, aluminum, or chromium and a weak organic acid.

U.S. Pat. No. 5,130,051 (Falk) discloses a process for encapsulating waste that contains toxic metals, including arsenic, by adding a mixture of alkaline silicate and magnesium oxide, and, optionally, borax, a concentrated acid, a reducing agent, and fly ash at high dosage rates.

The iron (ferric) sulfate treatment process is ineffective against reduced forms of arsenic and does not provide long-term stability of treated wastes because, under certain natural conditions, the ferric ions may be reduced to ferrous form, thereby remobilizing the arsenic. The solidification processes require very high additive dosages with resultant high bulking of the treated waste.

None of the known technologies discloses a process for cost-effectively and permanently stabilizing arsenic in the pore water associated with contaminated soil, sediment, or sludge (hereinafter collectively referred to as "waste matrix") where the arsenic can be present in trivalent and pentavalent states, and in both organic and inorganic forms. Pore water of a waste matrix does not exist independently, but rather resides in, and saturates, the waste matrix.

The patents mentioned in the Background of the Invention are specifically incorporated herein by reference in their entirety.

What is now needed is a method for treating an arsenic-contaminated waste matrix and associated pore water to stabilize the arsenic and reduce arsenic leaching to contaminant acceptable levels.

BRIEF SUMMARY OF THE INVENTION

The present invention provides a method for stabilizing arsenic-contaminated pore water of a waste matrix and reducing the leaching of arsenic to acceptable levels. A major objective of the invention is to provide a method for treating arsenic-contaminated pore water that contains arsenic in both the reduced (arsenite) and/or the oxidized (arsenate) form. Other objectives of the invention include efficiently treating both organic and inorganic arsenic compounds, providing long-term, permanent treatment of arsenic, providing treatment with low bulking potential, and providing a treatment method that is cost-effective and easy to conduct.

In the method of the present invention, an agent for controlling oxidation-reduction (redox) potential (ORP), an agent for controlling pH, and an agent for adsorption and coprecipitation of the arsenic are mixed with the arsenic-contaminated pore water.

The sum of the amounts of added ORP control agent, pH control agent and adsorption-coprecipitation agent are insufficient to cause the pore water to solidify without adding a binding agent of the type identified by Hooykaas. The ORP control agent and the pH control agent are added in amounts that will vary with the amount of contaminants present, but in any event, in amounts sufficient to bring most (at least about 50%) of the contaminating arsenic into its higher oxidized state. The arsenite/arsenate transition is controlled by adjusting the redox potential and pH in a coordinated manner. For example, see Vance, D. B., "Arsenic: Chemical Behavior and Treatment," *National Environmental Journal* 60–64 (May/June 1995), incorporated by reference herein in its entirety, which includes charts that depict the speciation of arsenic under various conditions. Agents for adsorbing and coprecipitating arsenic, such as ferric iron, are also known. Id. Although the chemicals used in the stabilization process can have a higher unit cost, the package cost is lower than that of solidification methods because the chemicals are used in small amounts. The ORP control agent, pH control agent and adsorption-coprecipitation agent can each be added to between 0.01 and 10 percent of the waste matrix, by weight.

The invention will be more fully understood upon consideration of the following detailed description.

BRIEF DESCRIPTION OF THE DRAWINGS

Not applicable.

DETAILED DESCRIPTION OF THE INVENTION

The invention describes a cost-effective, low-bulking, permanent method for stabilizing an arsenic-contaminated waste matrix wherein the method comprises the steps of incorporating an ORP control agent, a pH control agent, and an adsorption-coprecipitation agent. The types and additive rates of these component chemistries will depend on arsenic speciation and concentration, the waste matrix, and on the overall treatment objectives. A goal achieved by a method of the present invention is to bring the level of leachable arsenic to no higher than the maximum acceptable Toxicity Characteristic Leaching Procedure (TCLP) toxicity level of 5 mg/L dictated by RCRA. The same level would be set as the criterion for TCLP-arsenic in the Universal Treatment Standard (UTS). The leachable arsenic as measured by the TCLP test can be reduced to a level below the maximum acceptable toxicity level of 5.0 mg/L, e.g., 0.5 mg/L, and perhaps lower.

The arsenic-contaminated materials can include, but are not limited to, sediment, soil, sludge and industrial wastes. The method is a low-bulking method, by which it is intended that after practicing the method the waste matrix volume is preferably no more than 10% greater, and more preferably no more than 5% greater, than before stabilization.

In a first embodiment of the method, each of the three agents is a separate class of chemical compound. In a second embodiment, a single chemical additive can act as two components in the treatment. An alternative would be that the chemical species added initially as one component of the chemistry may react with a waste matrix to produce a second component of the chemistry. In another embodiment, under suitable conditions, one chemical compound added to a specific waste matrix can serve the function of all three components in the disclosed arsenic stabilization method.

The ORP control agent can increase or decrease the redox potential of the waste matrix depending upon the arsenic speciation and presence of other metal contaminants. It is desirable to reduce the mobility by providing conditions where most (at least about 50%, preferably 60 to 95%, more preferably 80 to 95%) of the arsenic compounds are present in the higher oxidized (arsenate) state. For example, if a substantial fraction of arsenic is present in the arsenite form and no other major heavy metal oxy-anions are present in the waste, an oxidizing ORP agent is selected to increase the redox potential of the waste matrix.

This can be complicated by the presence of other heavy metal oxy-anions, such as hexavalent chromium, in the waste matrix. If the waste contains arsenic and another such heavy metal compound, the leaching potential of both the arsenic and the other heavy metal is decreased by lowering the redox potential of the waste matrix using a reducing ORP control agent. In this situation the ORP is reduced enough to convert chromium from its hexavalent state to less mobile trivalent state while the ORP would still be in the range for arsenic to be present most in its less mobile pentavalent state.

The oxidizing ORP control agent can be any compound that increases the redox potential of the waste matrix, although the compound is preferably one that has insignificant environmental impact upon the matrix. Suitable oxidizing ORP control agents include potassium permanganate, sodium chlorate, sodium perchlorate, calcium chlorite or another chlorinated oxidizing agent, sodium percarbonate, sodium persulfate, sodium perborate, potassium persulfate, hydrogen peroxide, magnesium peroxide, or another peroxide compound, compounds of multivalent elements at their higher oxidation state (e.g., ferric sulfate), gaseous oxygen, and ozone.

The reducing ORP control agents can be any compound that decreases the redox potential of the waste matrix, although the compound is preferably one that has insignificant environmental impact upon the matrix. Suitable reducing ORP control agents include ferrous sulfate, sulfur dioxide, sodium bisulfite, sodium metabisulfite, or the like.

In the presence of the adsorption-coprecipitation agent, the pH of the waste matrix controls the leaching potential of arsenic in conjunction with the redox potential of the waste. The pH control agent is selected to raise or lower the pH of the waste matrix depending on the original acidity/alkalinity of the waste and the treatment objectives, in accordance with the diagrams shown in Vance, supra. The pH control agents for raising pH can be any compound that raises the pH, without significant environmental impact, and can include magnesium oxide or hydroxide, calcium oxide or hydroxide, barium oxide or hydroxide, reactive calcium carbonate, sodium hydroxide, dolomitic lime, limestone (high calcium or dolomite), and the like.

The pH control agents for lowering pH can be any compound that lowers the pH, without significant environmental impact, and can include sulfuric acid, phosphoric acid, another mineral acid, or ferric sulfate, ferric chloride, aluminum sulfate, aluminum chloride, and like acidic compounds.

A suitable adsorption-coprecipitation agent can react with arsenic to form an insoluble arsenic compound or can immobilize arsenic on its surface by chemical adsorption. The adsorption-coprecipitation agent can be, but is not limited to, ferric sulfate, aluminum sulfate, activated alumina, or manganese dioxide.

The chemical additives, which can be in a solid state, aqueous slurry, or in solution, are thoroughly mixed with the waste matrix to be stabilized. The stabilization method can be performed in situ using conventional earth-moving equipment such as a back hoe, tiller, or drag line, or ex situ by blending the additives with the waste matrix in a mechanical device, such as a pugmill or a cement mixer. In a typical practice of the method for stabilizing arsenic and reducing arsenic leachability, the ORP control agent is mixed first with the waste matrix, followed by the adsorption-coprecipitation agent and then the pH control agent. Alternatively, all three components can be added simultaneously to, and mixed with, the waste matrix. The additive dosage requirements typically total less than 10–15 percent of the weight of the waste matrix. This is a major advantage over solidification methods, which require 20–30 percent or higher dosages of additives, including cement-like materials.

If the additives are mixed uniformly with the waste, no curing step is required. This is another significant advantage over solidification systems which typically requiring curing periods of one week or more.

The present invention will be more fully understood upon consideration of the following Examples which are intended to be exemplary and not limiting.

EXAMPLE 1

TABLE 1

| Additive (wt %) | Untreated | | Treatment | | |
|---|---|---|---|---|---|
| ORP control (potassium permanganate) | — | — | — | — | 0.5 |
| pH control (magnesium oxide) | — | — | 1 | 1 | 1 |
| Ads/Coprecip (ferric sulfate) | — | 5 | 5 | 10 | 5 |
| TCLP (mg/L) | 26.0 | 17.0 | 2.4 | 1.9 | 0.75 |

An arsenic-contaminated river sediment contained 14,000 mg/kg dry weight total arsenic and was determined to contain hazardous levels of arsenic, with a screening TCLP-arsenic concentration of 26.0 mg/L. The sediment was treated with a 3-component treatment chemistry according to the present invention. In this trial, shown in Table 1, the ORP control agent (potassium permanganate) was added at 0.5 percent by weight. The pH control agent (magnesium oxide) was added at 1 percent by weight. The adsorption-coprecipitation (Ads/Coprecip) agent (ferric sulfate) was added at 5 percent by weight. The sediment treated according to the invention was nonhazardous and had a screening TCLP-arsenic concentration of 0.75 mg/L.

In controls, ferric sulfate alone (5 percent by weight) reduced the screening TCLP-arsenic concentration to 17.0 mg/L, while magnesium oxide (1 percent by weight) with ferric sulfate (5 percent by weight) reduced the screening TCLP-arsenic concentration to 2.4 mg/L, respectively. At a higher dosage of ferric sulfate (10 percent by weight) with magnesium oxide (1 percent by weight), treatability of the sediment improved marginally, reducing the screening TCLP-arsenic concentration to 1.9 mg/L.

EXAMPLE 2

TABLE 2

| Additive (wt %) | Untreated | Treatment | | | | |
|---|---|---|---|---|---|---|
| ORP control (potassium permanganate) | — | — | 5 | — | — | 5 |
| pH control (magnesium oxide) | — | 5 | — | — | 5 | 5 |
| Ads/Coprecip (ferric sulfate) | — | — | — | 5 | 5 | 5 |
| TCLP (mg/L) | 290 | 220 | 160 | 69 | 14.0 | 1.1 |

Arsenic-contaminated soil containing 10,100 mg/kg dry weight arsenic had a screening TCLP-arsenic concentration of 290 mg/L. This contaminated soil was treated with the additives described in Example 1, either singly or in combination. Separate treatment with 5 percent by weight dosages of potassium permanganate, magnesium oxide, or ferric sulfate gave screening TCLP-arsenic concentrations of 160 mg/L, 220 mg/L, and 69 mg/L, respectively. When magnesium oxide and ferric sulfate were mixed with the soil at 5 percent by weight each, the screening TCLP-arsenic concentration was reduced to 14.0 mg/L. When potassium permanganate, magnesium oxide, and ferric sulfate were added at 5 percent by weight each, the soil was rendered nonhazardous with a screening TCLP-arsenic concentration of 1.1 mg/L While the reduction of arsenic leachability in a waste matrix is an important objective, it is sometimes equally as important to reduce the leachability of antimony in the waste matrix. Specifically, the UTS requires that, once the leachable metal of concern (such as arsenic) in the waste matrix is reduced per TCLP toxicity standards, the leachable antimony must also be brought below a predetermined threshold, currently 1.15 mg/L. The UTS thus regulate the concentration of more metals that may be present in a waste matrix as compared to the TCLP toxicity standards, but also set lower limits than the TCLP toxicity for some metals. Antimony is one such metal that is not regulated by TCLP toxicity standards but is regulated by the UTS (the arsenic leachability standards are currently the same for both UTS and TCLP). Therefore, an additional goal achieved by the method of the present invention is to bring the level of leachable antimony to no higher than the maximum acceptable UTS toxicity level of 1.15 mg/L dictated by RCRA.

Advantageously, it has been discovered that the treatment of a waste matrix using any of the methods set forth by the present invention also reduces the leachability of antimony in a waste matrix. Specifically, the present invention reduces the antimony leachability to non-toxic levels in an antimony-toxic waste matrix as defined by the UTS. As an example, a soil sample was analyzed to leach 12 mg/L of antimony in the TCLP test, which rendered the soil toxic under the UTS.

The soil was treated with magnesium oxide at 2% by weight, and ferric sulfate at 20% by weight. In particular, the chemicals were individually added to the soil sample, after which the sample was mixed. It should be appreciated that the chemicals may alternatively be premixed and added as a single mixture to the soil sample. The magnesium oxide provided a pH control agent, while the ferric sulfate provided an ORP control agent, an adsorption-coprecipitation agent and a pH control agent. The leachability of antimony from the treated soil sample was 0.3 mg/L, thereby rendering the soil sample non-antimony toxic under the UTS.

It should be appreciated that any chemical or combination of chemicals that provides an ORP control agent, a pH control agent, and an adsorption-coprecipitation agent described in accordance with the present invention may be used to treat antimony in a waste matrix. It should furthermore be appreciated that the pore water of the waste matrix is stabilized with respect to antimony using the present method.

The present invention further recognizes that a cost-effective, low-bulking, permanent method for stabilizing an arsenic-contaminated liquid, in particular water, and more specifically pore water of a waste matrix may be achieved using the steps of incorporating an ORP control agent, a pH control agent, and an adsorption-coprecipitation agent as described above. The types and additive rates of these component chemistries will depend on arsenic speciation and concentration, the waste matrix, and on the overall treatment objectives. A goal achieved by a method of the present invention is to significantly reduce the level of leachable arsenic in pore water of a waste matrix.

The arsenic-contaminated materials can include, but are not limited to, pore water in sediment, soil, sludge and industrial wastes. The method is a low-bulking method, by which it is intended that after practicing the method, the waste matrix and corresponding pore water volume is preferably no more than 10% greater, and more preferably no more than 5% greater, than before stabilization In a first embodiment of the method, each of the three agents is a separate class of chemical compound. In a second embodiment, a single chemical additive can act as two components in the treatment. An alternative would be that the chemical species added initially as one component of the chemistry may react with the pore water to produce a second component of the chemistry. In another embodiment, under suitable conditions, one chemical compound added to a specific sediment can serve the function of all three components in the disclosed pore water arsenic stabilization method.

The ORP control agent can increase or decrease the redox potential of the pore water depending upon the arsenic speciation and presence of other metal contaminants. It is desirable to reduce the mobility by providing conditions where most (at least about 50%, preferably 60 to 95%, more preferably 80 to 95%) of the arsenic compounds are present in the higher oxidized (arsenate) state. For example, if a substantial fraction of arsenic is present in the arsenite form and no other major heavy metal oxy-anions are present in the pore water, an oxidizing ORP agent is selected to increase the redox potential of the pore water.

This can be complicated by the presence of other heavy metal oxy-anions, such as hexavalent chromium, in the pore water. If the pore water contains arsenic and another such heavy metal compound, the leaching potential of both the arsenic and the other heavy metal is decreased by lowering the redox potential of the pore water using a reducing ORP control agent. In this situation the ORP is reduced enough to convert chromium from its hexavalent state to less mobile trivalent state while the ORP would still be in the range for arsenic to be present most in its less mobile pentavalent state.

The oxidizing ORP control agent can be any compound that increases the redox potential of the pore water, although the compound is preferably one that has insignificant environmental impact upon the matrix. Suitable oxidizing ORP control agents include potassium permanganate, sodium chlorate, sodium perchlorate, calcium chlorite or another chlorinated oxidizing agent, sodium percarbonate, sodium persulfate, sodium perborate, potassium persulfate, hydrogen peroxide, magnesium peroxide, or another peroxide compound, compounds of multivalent elements at their higher oxidation state (e.g., ferric sulfate,), gaseous oxygen, and ozone.

The reducing ORP control agents can be any compound that decreases the redox potential of the pore water, although the compound is preferably one that has insignificant environmental impact upon the pore water. Suitable reducing ORP control agents include ferrous sulfate, sulfur dioxide, sodium bisulfite, sodium metabisulfite, or the like.

In the presence of the adsorption-coprecipitation agent, the pH of the pore water controls the leaching potential of arsenic in conjunction with the redox potential of the pore water. The pH control agent is selected to raise or lower the pH of the pore water depending on the original acidity/alkalinity of the pore water and the treatment objectives, in accordance with the diagrams shown in Vance, supra. The pH control agents for raising pH can be any compound that raises the pH, without significant environmental impact, and can include magnesium oxide or hydroxide, calcium oxide or hydroxide, barium oxide or hydroxide, reactive calcium carbonate, sodium hydroxide, dolomitic lime, limestone (high calcium or dolomite), and the like.

The pH control agents for lowering pH can be any compound that lowers the pH, without significant environmental impact, and can include sulfuric acid, phosphoric acid, another mineral acid, or ferric sulfate, ferric chloride, aluminum sulfate, aluminum chloride, and like acidic compounds.

A suitable adsorption-coprecipitation agent can react with arsenic to form an insoluble arsenic compound or can immobilize arsenic on its surface by chemical adsorption. The adsorption-coprecipitation agent can be, but is not limited to, ferric sulfate, aluminum sulfate, activated alumina, or manganese dioxide.

The chemical additives, which can be in a solid state, aqueous slurry, or in solution, are thoroughly mixed with the sediment whose pore water is to be stabilized. The stabilization method can be performed in situ using conventional earth-moving equipment such as a back hoe, tiller, or drag line, or ex situ by blending the additives with the sediment/pore water in a mechanical device, such as a pugmill or a cement mixer. In a typical practice of the method for stabilizing arsenic and reducing arsenic leachability, the ORP control agent is mixed first with the pore water, followed by the adsorption-coprecipitation agent and then the pH control agent. Alternatively, all three components can be added simultaneously to, and mixed with, the pore water. The additive dosage requirements typically total less than 10–15 percent of the weight of the pore water. This is a major advantage over solidification methods, which require 20–30 percent or higher dosages of additives, including cement-like materials.

If the additives are mixed uniformly with the pore water, no curing step is required. This is another significant advantage over solidification systems which typically requiring curing periods of one week or more.

The present invention will be more fully understood upon consideration of the following Examples which are intended to be exemplary and not limiting.

EXAMPLE 3

TABLE 3

| Additive (wt %) | Untreated | Treatment |
|---|---|---|
| ORP control | | ferric sulfate |
| pH control | | magnesium oxide ferric sulfate aluminum sulfate |
| Ads/Coprecip | | ferric sulfate aluminum sulfate |
| Pore water pH | 8.21 | 4.3 |
| Pore water Arsenic concentration (mg/L) | 1300 | 54 |
| Specific filtration resistance (SFR) (sec$^2$/g) | 37.21E8 | 1.75E8 |

In Example 3, an arsenic-contaminated river sediment with pore water containing 14,000 mg/kg dry weight total arsenic and was determined to contain TCLP toxic levels of arsenic. The sediment was treated with a 3-component treatment chemistry according to the present invention. In this trial, shown in Table 3, magnesium oxide was added at 0.7% by weight, ferric sulfate was added at 2.8% by weight, and aluminum sulfate was added at 1.4% by weight. The magnesium oxide served as the pH control agent, while the aluminum sulfate provided the dual function of a pH control agent and an adsorption-coprecipitation agent. The ferric sulfate provided all three functions—pH control agent, adsorption-coprecipitation agent, and an ORP control agent.

The sediment before treatment was 27% solid by weight (73% water), with a total arsenic content of 14,000 mg/kg dry weight. The pore water pH was 8.21, and the pore water had an arsenic concentration of 1300 mg/L. The specific filtration resistance (SFR) for the pore water was 37.21E8. The sediment was treated with the chemical composition described above by individually adding the chemicals to the sediment and subsequently mixing the sediment to treat the pore water. It should be appreciated, however, that the chemicals could be pre-mixed and then added to the waste matrix as a mixture. Advantageously, no curing step is required the present method. After the sediment was treated, the pore water pH was reduced to 4.3, the pore water arsenic concentration was reduced by 96% to 54 mg/L, and the SFR was reduced by 95.3% to 1.75E8 sec$^2$/g. It should be appreciated that, depending on the composition and concentration of the agents used, the SFR levels of the treated pore water could be anywhere between 17.5E8 and 0.0175E8 sec$^2$/g.

EXAMPLE 4

Treatment of Filter Cake

TABLE 4

| Additive (wt %) | Untreated | Treated |
|---|---|---|
| ORP control | — | ferric sulfate |
| pH control | — | magnesium oxide ferric sulfate aluminum sulfate |
| Ads/Coprecip | — | ferric sulfate aluminum sulfate |
| TCLP-arsenic (mg/L) | Toxic | 1.3 |
| arsenic concentration of filtrate (mg/L) | 263 | 4.1 |

In Example 4, a filter cake comprising a moist unsaturated TCLP-arsenic toxic sediment having a filtrate arsenic concentration of 263 mg/L was treated using the chemicals described above with reference to Example 3. In particular, the filter cake was treated with a mixture of magnesium oxide at 1%, ferric sulfate at 4%, and aluminum sulfate at 2% (all by weight). The untreated and treated filter cakes were tested for arsenic leachability, it being appreciated that the arsenic concentration in the pore water affects leachability of arsenic from the waste matrix. In particular, the untreated and treated filter cakes were separately slurried in equal weights of tap water to generate filtrate samples which were analyzed for arsenic content. The treated cake filtrate had an arsenic concentration of 4.1 mg/L, 98.4% reduced with respect to the untreated cake filtrate. Furthermore, leachability of the arsenic in the treated cake filtrate was reduced to a TCLP-arsenic concentration of 1.3 mg/L, thereby stabilizing the arsenic to a non-TCLP toxic level in the treated filtrate.

The above examples show that when an ORP control agent, a pH control agent, and an adsorption coprecipitation agent are added to pore water of a waste matrix, the treated pore water will have a reduced TCLP-arsenic toxicity contribution, a reduced pore water arsenic concentration, and a reduced specific filtration resistance of sediment to facilitate efficient dewatering, which is a common (and sometimes necessary) step in sediment stabilization. Furthermore, as described above, separate chemicals may provide the ORP control agent, adsorption coprecipitation agent, and pH control agent, respectively. Alternatively, any of the suitable chemicals identified above may provide the corresponding agents. Alternatively still, one chemical may suffice to provide one or more of the agents.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A method for stabilizing arsenic in arsenic-contaminated pore water of a waste matrix containing the pore water, the method comprising the steps of:
    mixing with the waste matrix an agent for controlling oxidation-reduction potential of the pore water, an agent for controlling pH of the pore water, and an agent for adsorbing and coprecipitating the arsenic, so that the arsenic concentration in the pore water is present at no higher than a preselected level, the sum of the amounts of the added agents being insufficient to cause the pore water to solidify if a binding agent were also added.

2. A method as claimed in claim 1 wherein the agent for controlling oxidation-reduction potential is an oxidizing agent.

3. A method as claimed in claim 2 wherein the agent for controlling oxidation-reduction potential is selected from a group consisting of potassium permanganate, sodium chlorate, sodium perchlorate, calcium chlorite, a chlorinated oxidizing agent, sodium percarbonate, sodium persulfate, sodium perborate, potassium persulfate, a peroxide compound, a compound of a multivalent element at its higher oxidation state, ferric sulfate, gaseous oxygen, and ozone.

4. A method as claimed in claim 1 wherein the agent for controlling pH is selected from a group consisting of an agent that raises the pH and an agent that lowers the pH.

5. A method as claimed in claim 4 wherein the agent for controlling pH is selected from a group consisting of magnesium oxide or hydroxide, calcium oxide or hydroxide, barium oxide or hydroxide, reactive calcium carbonate, sodium hydroxide, dolomitic lime, limestone, sulfuric acid, phosphoric acid, a mineral acid, or ferric sulfate, ferric chloride, aluminum sulfate and aluminum chloride.

6. A method as claimed in claim 1 wherein the agent for adsorption-coprecipitation is selected from a group consisting of ferric sulfate, aluminum sulfate, activated alumina, and manganese dioxide.

7. A method as claimed in claim 1 wherein the agent for controlling oxidation-reduction potential and the agent for adsorption-coprecipitation are the same agent.

8. A method as claimed in claim 7 wherein the agent for controlling oxidation-reduction potential and the agent for adsorption-coprecipitation is potassium permanganate.

9. A method as claimed in claim 1 wherein the agent for controlling pH and the agent for adsorption-coprecipitation are the same agent.

10. A method as claimed in claim 9 wherein the agent for controlling pH and the agent for adsorption-coprecipitation is ferric sulfate.

11. A method as claimed in claim 1 wherein at least two of the agents are ferric sulfate.

12. A method as claimed in claim 1 wherein all three agents are ferric sulfate.

13. A method as claimed in claim 1 wherein the agent for controlling oxidation-reduction potential of the water is potassium permanganate, the agent for controlling pH of the water is magnesium oxide, and the agent for adsorbing and coprecipitating the arsenic is ferric sulfate.

14. A method as claimed in claim 1, wherein the treated pore water has a specific filtration resistance between 0.0175E8 and 17.5E8 $sec^2/g$.

15. A method as claimed in claim 14, wherein the treated pore water has a specific filtration resistance 1.75E8 $sec^2/g$.

16. A method for stabilizing arsenic in an arsenic-contaminated pore water of a waste matrix containing the pore water, the method consisting essentially of the step of:
    mixing with the waste matrix an agent for controlling oxidation-reduction potential of the pore water, an agent for controlling pH of the pore water, and an agent for adsorbing and coprecipitating the arsenic, the sum of the amounts of added agents being insufficient to cause the pore water to solidify in the absence of a binding agent.

17. A method as claimed in claim 16 wherein the agent for controlling oxidation-reduction potential is an oxidizing agent.

18. A method as claimed in claim 17 wherein the agent for controlling oxidation-reduction potential is selected from a group consisting of potassium permanganate, sodium chlorate, sodium perchlorate, calcium chlorite or a chlorinated oxidizing agent, sodium percarbonate, sodium persulfate, sodium perborate, potassium persulfate, a peroxide compound, a compound of a multivalent element at its higher oxidation state, ferric sulfate, gaseous oxygen, and ozone.

19. A method as claimed in claim 16 wherein the agent for controlling pH is selected from a group consisting of an agent that raises the pH and an agent that lowers the pH.

20. A method as claimed in claim 17 wherein the agent for controlling pH is selected from a group consisting of magnesium oxide or hydroxide, calcium oxide or hydroxide, barium oxide or hydroxide, reactive calcium carbonate, sodium hydroxide, dolomitic lime, limestone, sulfuric acid, phosphoric acid, a mineral acid, or ferric sulfate, ferric chloride, aluminum sulfate and aluminum chloride.

21. A method as claimed in claim 16 wherein the agent for adsorption-coprecipitation is selected from a group consisting of ferric sulfate, aluminum sulfate, activated alumina, and manganese dioxide.

22. A method as claimed in claim 16 wherein the agent for controlling oxidation-reduction potential and the agent for adsorption-coprecipitation are the same agent.

23. A method as claimed in claim 22 wherein the agent for controlling oxidation-reduction potential and the agent for adsorption-coprecipitation is potassium permanganate.

24. A method as claimed in claim 16 wherein the agent for controlling pH and the agent for adsorption-coprecipitation are the same agent.

25. A method as claimed in claim 24 wherein the agent for controlling pH and the agent for adsorption-coprecipitation is ferric sulfate.

26. A method as claimed in claim 16 wherein at least two of the agents are ferric sulfate.

27. A method as claimed in claim 16 wherein all three agents are ferric sulfate.

28. A method as claimed in claim 16 wherein the agent for controlling oxidation-reduction potential of the pore water is potassium permanganate, the agent for controlling pH of the pore water is magnesium oxide, and the agent for adsorbing and coprecipitating the arsenic is ferric sulfate.

29. A method as claimed in claim 16, wherein the treated pore water has a specific filtration resistance between 0.0175E8 and 17.5E8 $sec^2/g$.

30. A method as claimed in claim 29, wherein the treated pore water has a specific filtration resistance 1.75E8 $sec^2/g$.

31. A method for stabilizing antimony in an antimony-contaminated waste matrix, the method comprising:
mixing with the waste matrix an agent for controlling oxidation-reduction potential of the liquid, an agent for controlling pH of the liquid, and an agent for adsorbing and coprecipitating the antimony, so that the antimony leaches from the waste matrix at no higher than a preselected level, the sum of the amounts of the added agents being insufficient to cause the waste matrix to solidify if a binding agent were also added.

32. A method as claimed in claim 31 wherein the agent for controlling oxidation-reduction potential is an oxidizing agent.

33. A method as claimed in claim 32 wherein the agent for controlling oxidation-reduction potential is selected from a group consisting of potassium permanganate, sodium chlorate, sodium perchlorate, calcium chlorite or a chlorinated oxidizing agent, sodium percarbonate, sodium persulfate, sodium perborate, potassium persulfate, a peroxide compound, a compound of a multivalent element at its higher oxidation state, ferric sulfate, gaseous oxygen, and ozone.

34. A method as claimed in claim 31 wherein the agent for controlling pH is selected from a group consisting of an agent that raises the pH and an agent that lowers the pH.

35. A method as claimed in claim 34 wherein the agent for controlling pH is selected from a group consisting of magnesium oxide or hydroxide, calcium oxide or hydroxide, barium oxide or hydroxide, reactive calcium carbonate, sodium hydroxide, dolomitic lime, limestone, sulfuric acid, phosphoric acid, a mineral acid, or ferric sulfate, ferric chloride, aluminum sulfate and aluminum chloride.

36. A method as claimed in claim 31 wherein the agent for adsorption-coprecipitation is selected from a group consisting of ferric sulfate, aluminum sulfate, activated alumina, and manganese dioxide.

37. A method as claimed in claim 31 wherein the agent for controlling oxidation-reduction potential and the agent for adsorption-coprecipitation are the same agent.

38. A method as claimed in claim 33 wherein the agent for controlling oxidation-reduction potential and the agent for adsorption-coprecipitation is potassium permanganate.

39. A method as claimed in claim 31 wherein the agent for controlling pH and the agent for adsorption-coprecipitation are the same agent.

40. A method as claimed in claim 39 wherein the agent for controlling pH and the agent for adsorption-coprecipitation is ferric sulfate.

41. A method as claimed in claim 31 wherein at least two of the agents are ferric sulfate.

42. A method as claimed in claim 31 wherein all three agents are ferric sulfate.

43. A method as claimed in claim 31 wherein the agent for controlling oxidation-reduction potential of the liquid is potassium permanganate, the agent for controlling pH of the liquid is magnesium oxide, and the agent for adsorbing and coprecipitating the arsenic is ferric sulfate.

44. A method as claimed in claim 31, wherein the mixing step further stabilizes antimony in pore water of the waste matrix.

45. A composition for stabilizing a toxic metal in a waste matrix, the composition comprising an agent for controlling oxidation-reduction potential of the matrix, an agent for controlling pH of the matrix, and an agent for adsorbing and coprecipitating the material.

46. A composition as claimed in claim 45 wherein the agent for controlling oxidation-reduction potential is an oxidizing agent.

47. A composition as claimed in claim 46 wherein the agent for controlling oxidation-reduction potential is selected from a group consisting of potassium permanganate, sodium chlorate, sodium perchlorate, calcium chlorite, a chlorinated oxidizing agent, sodium percarbonate, sodium persulfate, sodium perborate, potassium persulfate, a peroxide compound, a compound of a multivalent element at its higher oxidation state, ferric sulfate, gaseous oxygen, and ozone.

48. A composition as claimed in claim 45 wherein the agent for controlling pH is selected from a group consisting of an agent that raises the pH and an agent that lowers the pH.

49. A composition as claimed in claim 47 wherein the agent for controlling pH is selected from a group consisting of magnesium oxide or hydroxide, calcium oxide or hydroxide, barium oxide or hydroxide, reactive calcium carbonate, sodium hydroxide, dolomitic lime, limestone, sulfuric acid, phosphoric acid, a mineral acid, or ferric sulfate, ferric chloride, aluminum sulfate and aluminum chloride.

50. A composition as claimed in claim 46 wherein the agent for adsorption-coprecipitation is selected from a group consisting of ferric sulfate, aluminum sulfate, activated alumina, and manganese dioxide.

51. A composition as claimed in claim 45 wherein the agent for controlling oxidation-reduction potential and the agent for adsorption-coprecipitation are the same agent.

52. A composition as claimed in claim 51 wherein the agent for controlling oxidation-reduction potential and the agent for adsorption-coprecipitation is potassium permanganate.

53. A composition as claimed in claim 45 wherein the agent for controlling pH and the agent for adsorption-coprecipitation are the same agent.

54. A composition as claimed in claim 53 wherein the agent for controlling pH and the agent for adsorption-coprecipitation is ferric sulfate.

55. A composition as claimed in claim 45 wherein at least two of the agents are ferric sulfate.

56. A composition as claimed in claim 45 wherein all three agents are ferric sulfate.

57. A composition as claimed in claim 45 wherein the agent for controlling oxidation-reduction potential of the matrix is potassium permanganate, the agent for controlling pH of the matrix is magnesium oxide, and the agent for adsorbing and coprecipitating the arsenic is ferric sulfate.

58. A composition as claimed in claim 45, wherein the toxic metal is arsenic.

59. A composition as claimed in claim 45, wherein the toxic metal is antimony.

* * * * *